Oct. 13, 1964  G. J. FAIRBANKS  3,152,367
DEFROST DEFLECTOR FOR A VOLKSWAGEN
Filed Jan. 12, 1962
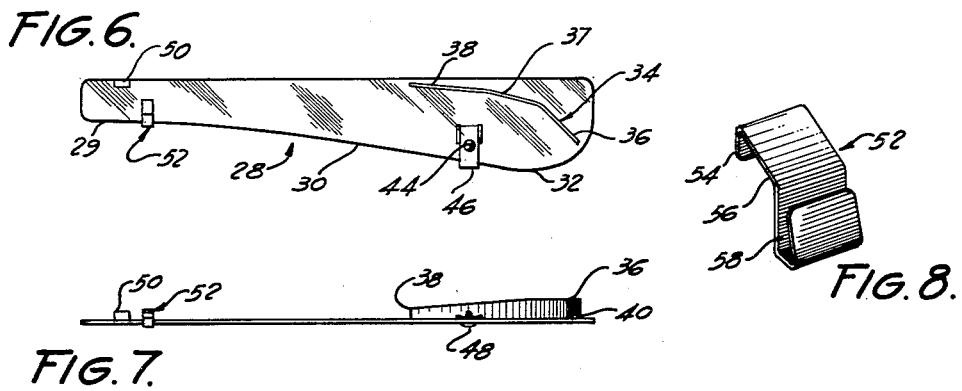
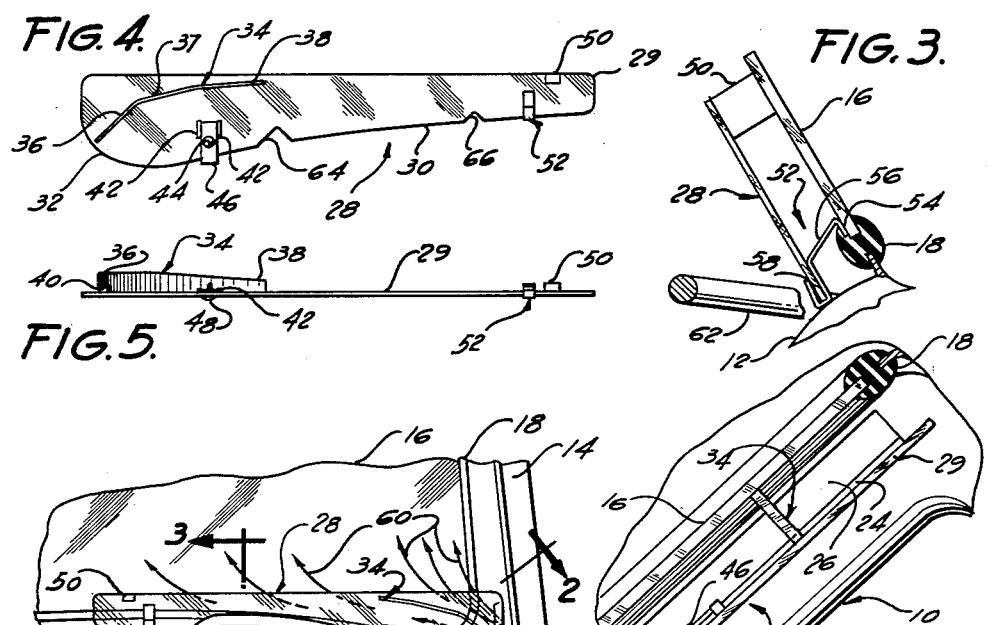
INVENTOR
Gordon J. Fairbanks
By *[signature]*
Attorney

# United States Patent Office 3,152,367
Patented Oct. 13, 1964

3,152,367
DEFROST DEFLECTOR FOR A VOLKSWAGEN
Gordon J. Fairbanks, Indianapolis, Ind., assignor to Stewart-Warner Corporation, Chicago, Ill., a corporation of Virginia
Filed Jan. 12, 1962, Ser. No. 165,874
3 Claims. (Cl. 20—40.5)

This invention relates to a defrost deflector operable to direct defrosting air across the windshield of a Volkswagen automotive vehicle, and in particular, to a defrost deflector readily securable to the Volkswagen without prior fabrication thereto.

The standard Volkswagen has as part of its heater system a pair of defrost vents located at the lower outside corners of the windshield. Each vent is defined on its side remote from the windshield by a small web extending in a fillet-type contour across the corner between the vertical door post and horizontal dash. Each web projects from the frame structure approximately ½" and terminates at its ends at the door post approximately 3" upward from the corner and on the dash approximately 5" inward from the corner. The web is inclined slightly toward the windshield and is spaced at its edge approximately ¾" therefrom.

The air for defrosting the windshield thus is discharged from the vent and guided by the small web supposedly across the interior surface of the windshield. It has been noted, however, that the small web does not effectively retain the defrosting air against the windshield, but permits it to migrate toward the interior of the vehicle. This not only allows incomplete defrosting, but also causes objectionable direct blast of defrosting air on the face of the driver and/or the front seat passenger.

Thus an object of this invention is to provide a defrost deflector for a Volkswagen which improves defrosting of the windshield and also eliminates the direct air blast on the faces of the front seat occupants.

Another object of this invention is to provide a defrost deflector which can be readily attached to a standard Volkswagen without fabrication thereto, but which is secured in place by means of its own design.

These and other objects will be more fully appreciated after a complete disclosure of the subject invention given in the following specification, of which the drawing forms a part thereof, wherein:

FIG. 1 is an elevational view of the passenger side of a Volkswagen automotive vehicle showing portions of the dash, window post and windshield, and including an embodiment of the subject invention;

FIG. 2 is a view as seen generally from line 2—2 of FIG. 1;

FIG. 3 is a view as seen generally from line 3—3 of FIG. 1;

FIG. 4 is a rear elevational view of the defrost deflector of FIG. 1;

FIG. 5 is a view as seen generally from the bottom of FIG. 4;

FIG. 6 is a rear elevational view of a defrost deflector similar to that shown in FIG. 1 except for use on the driver's side of the Volkswagen;

FIG. 7 is a view as seen generally from the bottom of FIG. 6;

FIG. 8 is a perspective view of a securing clip used on the subject invention.

Referring first to FIGS. 1, 2 and 3 of the drawing, the Volkswagen interior shown includes a dash 10 having a generally horizontal dash surface 12, a vertical door post 14, and a windshield 16. The windshield 16 is secured in place by means of rubber molding 18 around the periphery thereof. At the lower outward corner of the windshield 16 raised arcuate web 24 interconnects the dash surface 12 and door post 14 and defines the remote side of an opening or vent 26 (FIG. 2) from which the defrost air is discharged.

The subject defrost deflector 28 is formed of transparent material, such as clear plastic. The deflector includes a tapered generally flat body 29 having a slightly concave contour 30 merging at its larger end with convex contour 32. The contour 30 is adapted to fit adjacent the dash surface 12 and thus is comparable in shape to the outline of surface 12 to be matable therewith. Contour 32 is adapted to overlap the web 24; so it is comparable thereto in shape but of slightly larger radius of curvature.

A vane 34 is bonded to the deflector body 29 on the side thereof adapted to be adjacent the windshield 16. The vane 34 is composed of a generally straight portion 36 adjacent and generally normal to the convex contour 32, and a series of straight portions 37 and 38 extending at progressively greater angles from straight portion 36. The vane 34 tapers from its widest at end 36 to its narrowest at end 38, which is approximately ⅜". A notch 40 is formed in straight portion 36 adjacent the body 29 and is of comparable depth and width, respectively, to the height and thickness of the web 24.

A pair of guides 42 are bonded to the inside of the body 29 on opposite sides of an opening 44 formed therein spaced from contour 30 by a distance greater than the height of web 24. Flat spring clamp 46 having a threaded opening therein is received between the guides 42 and held therein by screw member 48, the lower end of the clamp projecting past the contour 30 of the body 29. A spacer element 50 approximately ¼" wide is bonded to the body 29 at the narrow end thereof spaced from the convex contour 32. Spring clip 52 (FIG. 8) formed from flat stock includes a prong end 54, a straight intermediate portion 56 at an acute angle from the prong 54, and a U-shaped spring gripping end 58 open in the opposite direction from that of prong 54. Gripping end 58 is of size comparable to the thickness of body 29 adapted to hold the body securely by friction. The prong end 54 of the spring clip 52 is adapted to be inserted between the rubber molding 18 and the windshield 16 until the gripping end 58 abuts the dash surface 12.

In use, the defrost deflector 28 is positioned in the corner of windshield 16 on the outside of the web 24. The clamp 46 is positioned on the inside of web 24 between the web and the windshield 16. By tightening screw 48, the web 24 is squeezed between the deflector body 29 and the clamp 46 for secure friction fit. The notch 40 on vane 34 receives the web 24 to maintain the upper portion of the defrost deflector secure against the web. The prong end 54 of the spring clip 52 is readily inserted between the windshield 16 and rubber molding 18 at an appropriate location along the dash, and maintained in position by the resilient force of the molding. Deflector body 29 is easily fitted into the gripping end 58 of clip 52 to secure the inward end of the deflector firmly in place. The spacer 50 and narrow end 38 of vane 34 maintain the upper edge of the defrost deflector 29 appropriately spaced from windshield 16.

The deflector 28 maintains the defrosting air from vent 26 in close contact with the windshield 16 throughout the entire length of the deflector. The defrosting air is guided by the deflector 29 and vane 34 to both above and below the vane as is represented by the arrows 60 to cover the entire windshield. The objectionable hot blast of defrosting air in the face of the front seat occupants is eliminated because of the hugging effect of the air on the windshield.

In certain models of the Volkswagen, a U-shaped handgrip 62 projects from the passenger side of dash 10 at approximately a 45° angle from the vertical. FIG. 4.

shows a deflector 28 having a pair of spaced notches 64 and 66 in concave contour 30 which are adapted to be positioned over the base mountings of the hand grip 62. FIG. 6 shows the defrost deflector 28 without the notches adaptable for the driver's side of the Volkswagen. The deflectors 28 of FIGS. 4 and 6 are otherwise identical in all respects, except they are the mirror images of each other.

Thus the subject defrost deflector is readily adaptable for a standard Volkswagen automotive vehicle without requiring special fabrication of the Volkswagen or causing a permanent-type installation. The easily insertable spring clip 52 secures the inward end of the deflector 28 while clamp 46 and notched vane 34 secure the outward end.

While a single embodiment has been shown, it will be obvious to those skilled in the art that other modifications can be made therein without departing from the true concept of the invention. Accordingly, it is desired that the invention not be limited by the disclosure shown but by the claims hereinafter following.

What is claimed is:

1. For use with a windshield of a motor vehicle having a defrosting vent defined in part by a thin web integral with the vehicle of limited dimension spaced from the windshield for directing defrosting air toward the windshield, the improvement comprising in combination with the defrosting vent and web a defrost deflector including a thin generally planar member of area larger than that of the web but substantially smaller than that of the windshield, said planar member being positioned adjacent the web on the side thereof remote from the windshield and having an opening therethrough spaced from the web, a clamp member having a threaded opening therein, a screw member extending through the opening of the planar member into the aligned threaded opening of the clamp member adjustably holding them together, said clamp member being on the side of the planar member so that the adjacent portions on the clamp member and the planar member spaced from the screw member are positioned on opposite sides of the web for direct abutment therewith, said screw member drawing the adjacent portions of the members together until the abutment thereof with the web tightly clamps the web therebetween, and an air guiding vane secured to the generally planar member on the same side thereof as but spaced from the clamp member in general alignment with the defrosting vent and extending across the planar member from the portion thereof abutting the web toward the opposite edge, said vane having at one end a notch adjacent the planar member open to the web receiving therein the web in snug securing fit and abutting at its other end the windshield and being of such thickness to space the planar member opposite the web the desired distance from the windshield.

2. For use in a Volkswagen having a windshield mounted in rubber molding at its lower periphery and having a defrosting vent at each lower outward corner of the windshield defined in part by a thin web integral with the Volkswagen of limited dimension spaced from the windshield and projecting from the dash surface, the improvement comprising in combination with the defrosting vent and web a defrost deflector including an elongated planar member of substantially less area than the windshield fabricated of a clear plastic material, said elongated member being positionable at the lower corner of the windshield with its lower contour closely adjacent the dash surface and with one end thereof overlapping and abutting the web of the defrosting vent, a vane secured to the elongated member at its end overlapping the web and having a notch therein adjacent the elongated member adapted to receive snugly the web of the defrosting vent, a clamp member mounted on the elongated member at the end thereof overlapping the web and adapted in part also to overlap the web on the opposite side of said web from the elongated member, screw means extending through aligned openings in the elongated member and the clamp member spaced from the web operable to draw the members together to clamp frictionally the web therebetween, and a spring clip having a prong end insertable between the windshield and the rubber molding to be frictionally retained therein and having its opposite end generally U-shaped to receive and hold frictionally therein the lower portion of the elongated member.

3. For use in a Volkswagen having a windshield mounted in rubber molding at its lower periphery and having a defrosting vent at each lower outward corner of the windshield defined in part by a thin web integral with the Volskwagen of limited dimension spaced from the windshield and projecting from the dash surface, the improvement comprising in combination with the defrosting vent and web a defrost deflector including an elongated planar member of substantially less area than the windshield fabricated of a clear plastic material, said elongated member being positioned at the lower corner of the windshield with its lower contour closely adjacent the dash surface and with one end thereof overlapping and abutting the web of the defrosting vent on the side thereof remote from the windshield, a vane secured to the elongated member on the side thereof adjacent the windshield and extending across the member proximate the overlapping portion thereof in a curved manner upward and inwardly toward the center of the windshield, said vane having at its end proximate the overlapping end a notch adjacent the elongated member open to and effective to receive snugly the web of the defrosting vent, said vane at its other end being operable to abut the windshield and being of thickness effective to space the upper portion of the elongated member from the windshield, a clamp member mounted on the elongated member between the windshield and the elongated member and in part overlapping and abutting the opposite side of said web from the elongated member, means including a screw member extending through an opening in the elongated member spaced from the web and into a receiving threaded opening in the clamp member operable to draw the members together to clamp frictionally the web between the members, and a spring clip having a thin prong end insertable between the windshield and the rubber molding effective to be frictionally retained therein and having its opposite end generally U-shaped to receive and hold frictionally therein the lower portion of the elongated member.

References Cited in the file of this patent

UNITED STATES PATENTS

| | | |
|---|---|---|
| 1,778,882 | Becker | Oct. 21, 1930 |
| 2,096,901 | Knecht | Oct. 26, 1937 |
| 2,154,731 | Crowley | Apr. 18, 1939 |
| 2,594,231 | Squiers | Apr. 22, 1952 |
| 2,659,942 | Iverson | Nov. 24, 1953 |
| 2,779,067 | Stanley | Jan. 29, 1957 |